(12) United States Patent
Ahmad

(10) Patent No.: US 12,445,558 B2
(45) Date of Patent: Oct. 14, 2025

(54) METHOD, SYSTEM, AND ARTICLE OF MANUFACTURE FOR BENCHMARKING PAIRING STRATEGIES IN CONTACT CENTER SYSTEM

(71) Applicant: Isbei Ltd., Grand Cayman (KY)

(72) Inventor: Yasir Zamir Ahmad, Islamabad (PK)

(73) Assignee: ISBEI LTD., Grand Cayman (KY)

( * ) Notice: Subject to any disclaimer, the term of this patent is extended or adjusted under 35 U.S.C. 154(b) by 39 days.

(21) Appl. No.: 18/342,868

(22) Filed: Jun. 28, 2023

(65) Prior Publication Data
US 2025/0008022 A1 Jan. 2, 2025

(51) Int. Cl.
H04M 3/00 (2024.01)
H04M 3/51 (2006.01)
H04M 3/523 (2006.01)

(52) U.S. Cl.
CPC ....... H04M 3/5232 (2013.01); H04M 3/5175 (2013.01)

(58) Field of Classification Search
CPC .......................... H04M 3/5232; H04M 3/5175
See application file for complete search history.

(56) References Cited

U.S. PATENT DOCUMENTS

| | | | |
|---|---|---|---|
| 10,110,746 B1 * | 10/2018 | Chishti | ............ H04M 3/5232 |
| 10,122,860 B1 | 11/2018 | Chishti | |
| 10,298,763 B2 | 5/2019 | Chishti | |
| 10,509,671 B2 | 12/2019 | Ittai | |
| 10,893,146 B2 * | 1/2021 | Chishti | ............ H04M 3/5141 |
| 11,070,674 B2 | 7/2021 | Chishti | |
| 11,399,096 B2 | 7/2022 | Chishti | |

(Continued)

FOREIGN PATENT DOCUMENTS

| | | |
|---|---|---|
| CN | 108629481 A | 10/2018 |
| CN | 108780533 A | 11/2018 |

(Continued)

OTHER PUBLICATIONS

CN2023107710496-The First Office Action and Translation dated Jul. 1, 2025.

(Continued)

*Primary Examiner* — Rasha S Al Aubaidi
(74) *Attorney, Agent, or Firm* — Oppedahl Patent Law Firm LLC (57) ABSTRACT

Provided are techniques at least two pairing strategies in a contact center system, involving a method, a system and an article of manufacture. The method of present disclosure includes: assigning sequence numbers to a series of events; initiating a first pairing strategy based on the sequence numbers; ending the first pairing strategy based on the sequence numbers; initiating a second pairing strategy based on the sequence numbers; ending the second pairing strategy based on the sequence numbers; assigning a first set of values to contacts assigned by the first pairing strategy; assigning a second set of values to contacts assigned by the second pairing strategy; and determining a metric that compares the first pairing strategy with the second pairing strategy based on the first and second set of values. The techniques of present disclosure can get rid of shortcomings and/or drawbacks of a time-based benchmark.

18 Claims, 9 Drawing Sheets

(56) References Cited

U.S. PATENT DOCUMENTS

| | | |
|---|---|---|
| 2014/0280426 A1 | 9/2014 | Clarkson |
| 2015/0332414 A1 | 11/2015 | Unser |
| 2016/0247163 A1 | 8/2016 | Donsky |
| 2020/0329148 A1* | 10/2020 | Chishti .............. H04M 3/5232 |
| 2025/0005024 A1 | 1/2025 | Sheikh |
| 2025/0184430 A1 | 6/2025 | Sheikh |

FOREIGN PATENT DOCUMENTS

| | | |
|---|---|---|
| CN | 110709826 A | 1/2020 |
| CN | 113095658 A | 7/2021 |
| CN | 113163062 A | 7/2021 |

OTHER PUBLICATIONS

CN2023107710689-The First Office Action and Translation dated Jul. 23, 2025.

\* cited by examiner

Fig. 1

| Time | Events | Assignment Algorithm | Assignment | Agent Queue |
|---|---|---|---|---|
| 9:00 | nil | nil | nil | nil |
| 9:01 | Agent 141 became available | nil | nil | 141* |
| 9:02 | Agent 142 became available | nil | nil | 141*, 142 |
| 9:03 | Agent 143 became available | nil | nil | 141*, 142, 143 |
| 9:04 | Agent 144 became available | nil | nil | 141*, 142, 143, 144 |
| 9:05 | Agent 145 became available | nil | nil | 141*, 142, 143, 144, 145 |
| 9:06 | Agent 146 became available | nil | nil | 141*, 142, 143, 144, 145, 146 |
| 9:07 | Agent 147 became available | nil | nil | 141*, 142, 143, 144, 145, 146, 147 |
| 9:08 | Agent 148 became available | nil | nil | 141*, 142, 143, 144, 145, 146, 147, 148 |
| 9:09 | Agent 149 became available | nil | nil | 141*, 142, 143, 144, 145, 146, 147, 148, 149 |
| 9:10 | Agent 150 became available | nil | nil | 141*, 142, 143, 144, 145, 146, 147, 148, 149, 150 |
| 9:11 | Contact A arrived | FIFO | Agent 141 was assigned to Contact A | 142*, 143, 144, 145, 146, 147, 148, 149, 150 |
| 9:12 | Contact B arrived | FIFO | Agent 142 was assigned to Contact B | 143*, 144, 145, 146, 147, 148, 149, 150 |
| 9:13 | Contact C arrived | FIFO | Agent 143 was assigned to Contact C | 144*, 145, 146, 147, 148, 149, 150 |
| 9:14 | Contact D arrived | FIFO | Agent 144 was assigned to Contact D | 145*, 146, 147, 148, 149, 150 |
| 9:15 | Contact E arrived | FIFO | Agent 145 was assigned to Contact E | 146*, 147, 148, 149, 150 |
| 9:16 | Contact F arrived | FIFO | Agent 146 was assigned to Contact F | 147*, 148, 149, 150 |
| 9:17 | Contact G arrived | FIFO | Agent 147 was assigned to Contact G | 148*, 149, 150 |
| 9:18 | Contact H arrived | FIFO | Agent 148 was assigned to Contact H | 149*, 150 |
| 9:19 | Contact I arrived | FIFO | Agent 149 was assigned to Contact I | 150* |
| 9:20 | Contact J arrived | FIFO | Agent 150 was assigned to Contact J | nil |

Legend
* Longest Waiting

Fig. 2

Performance Based Routing (PBR) Simulation

| Time | Events | Assignment Algorithm | Assignment | Agent Queue |
|---|---|---|---|---|
| 9:00 | nil | nil | nil | nil |
| 9:01 | Agent 141 became available | nil | nil | 141 |
| 9:02 | Agent 142 became available | nil | nil | 141, 142 |
| 9:03 | Agent 143 became available | nil | nil | 141, 142, 143 |
| 9:04 | Agent 144 became available | nil | nil | 141, 142, 143, 144 |
| 9:05 | Agent 145 became available | nil | nil | 141, 142, 143, 144, 145 |
| 9:06 | Agent 146 became available | nil | nil | 141, 142, 143, 144, 145, 146 |
| 9:07 | Agent 147 became available | nil | nil | 141, 142, 143, 144, 145, 146, 147 |
| 9:08 | Agent 148 became available | nil | nil | 141, 142, 143, 144, 145, 146, 147, 148 |
| 9:09 | Agent 149 became available | nil | nil | 141, 142, 143, 144, 145, 146, 147, 148, 149 |
| 9:10 | Agent 150 became available | nil | nil | 141, 142, 143, 144, 145, 146, 147, 148, 149, 150 |
| 9:11 | Contact A arrived | PBR | Agent 144 was assigned to Contact A | 141, 142, 143, 145, 146, 147, 148, 149, 150 |
| 9:12 | Contact B arrived | PBR | Agent 148 was assigned to Contact B | 141, 142, 143, 145, 146, 147, 149, 150 |
| 9:13 | Contact C arrived | PBR | Agent 146 was assigned to Contact C | 141, 142, 143, 145, 147, 149, 150 |
| 9:14 | Contact D arrived | PBR | Agent 141 was assigned to Contact D | 142, 143, 145, 147, 149, 150 |
| 9:15 | Contact E arrived | PBR | Agent 149 was assigned to Contact E | 142, 143, 145, 147, 150 |
| 9:16 | Contact F arrived | PBR | Agent 142 was assigned to Contact F | 143, 145, 147, 150 |
| 9:17 | Contact G arrived | PBR | Agent 150 was assigned to Contact G | 143, 145, 147 |
| 9:18 | Contact H arrived | PBR | Agent 145 was assigned to Contact H | 143, 147 |
| 9:19 | Contact I arrived | PBR | Agent 143 was assigned to Contact I | 147 |
| 9:20 | Contact J arrived | PBR | Agent 147 was assigned to Contact J | nil |

| Agent | 141 | 142 | 143 | 144 | 145 | 146 | 147 | 148 | 149 | 150 |
|---|---|---|---|---|---|---|---|---|---|---|
| Score | 70 | 50 | 20 | 100 | 30 | 80 | 10 | 90 | 60 | 40 |

Legend
Highest Performing

Fig. 3

Time-based Benchmark Simulation

| Time | Events | Assignment Algorithm | Assignment | Agent Queue |
|---|---|---|---|---|
| 9:00 | nil | nil | nil | nil |
| 9:01 | Agent 141 became available | nil | nil | 141* |
| 9:02 | Agent 142 became available | nil | nil | 141*, 142 |
| 9:03 | Agent 143 became available | nil | nil | 141*, 142, 143 |
| 9:04 | Agent 144 became available | nil | nil | 141*, 142, 143, 144 |
| 9:05 | Agent 145 became available | nil | nil | 141*, 142, 143, 144, 145 |
| 9:06 | Agent 146 became available | nil | nil | 141*, 142, 143, 144, 145, 146 |
| 9:07 | Agent 147 became available | nil | nil | 141*, 142, 143, 144, 145, 146, 147 |
| 9:08 | Agent 148 became available | nil | nil | 141*, 142, 143, 144, 145, 146, 147, 148 |
| 9:09 | Agent 149 became available | nil | nil | 141*, 142, 143, 144, 145, 146, 147, 148, 149 |
| 9:10 | Agent 150 became available | nil | nil | 141*, 142, 143, 144, 145, 146, 147, 148, 149, 150 |
| 9:12 | Contact A arrived | FIFO | Agent 141 was assigned to Contact A | 142*, 143, 144, 145, 146, 147, 148, 149, 150 |
| 9:20 | Contact B arrived | FIFO | Agent 142 was assigned to Contact B | 143*, 144, 145, 146, 147, 148, 149, 150 |
| 9:45 | Contact C arrived | PBR | Agent 144 was assigned to Contact C | 143*, 145, 146, 147, 148, 149, 150 |
| 10:06 | Contact D arrived | FIFO | Agent 143 was assigned to Contact D | 145*, 146, 147, 148, 149, 150 |
| 10:10 | Contact E arrived | FIFO | Agent 145 was assigned to Contact E | 146*, 147, 148, 149, 150 |
| 10:29 | Contact F arrived | FIFO | Agent 146 was assigned to Contact F | 147*, 148, 149, 150 |
| 10:35 | Contact G arrived | PBR | Agent 148 was assigned to Contact G | 147*, 149, 150 |
| 10:40 | Contact H arrived | PBR | Agent 149 was assigned to Contact H | 147*, 150 |
| 10:43 | Contact I arrived | PBR | Agent 150 was assigned to Contact I | 147* |
| 10:58 | Contact J arrived | PBR | Agent 147 was assigned to Contact J | nil |

| Agent | 141 | 142 | 143 | 144 | 145 | 146 | 147 | 148 | 149 | 150 |
|---|---|---|---|---|---|---|---|---|---|---|
| Score | 70 | 50 | 20 | 100 | 30 | 80 | 10 | 90 | 60 | 40 |

Legend
* Longest Waiting
_ Highest Performing
*_ Highest Performing and Longest waiting

Fig. 4

| Time | Contact Quantity | Average Contact Quality | Assignment Algorithm |
|---|---|---|---|
| 9:01-9:30 | 20 | 60 | FIFO |
| 9:31-10:00 | 30 | 57 | PBR |
| 10:01-10:30 | 40 | 59 | FIFO |
| 10:31-11:00 | 30 | 58 | PBR |
| 11:01-11:30 | 150 | 56 | FIFO |
| 11:31-12:00 | 100 | 54 | PBR |
| 12:01-12:30 | 70 | 57 | FIFO |
| 12:31-13:00 | 20 | 53 | PBR |

Fig. 5

Pseudo-Random Benchmark Simulation

| Time | Events | Pseudo-random # | Assignment Algorithm | Assignment | Agent Queue |
|---|---|---|---|---|---|
| 9:00 | nil | nil | nil | nil | nil |
| 9:01 | Agent 141 became available | nil | nil | nil | 141* |
| 9:02 | Agent 142 became available | nil | nil | nil | 141*, 142 |
| 9:03 | Agent 143 became available | nil | nil | nil | 141*, 142, 143 |
| 9:04 | Agent 144 became available | nil | nil | nil | 141*, 142, 143, __144__ |
| 9:05 | Agent 145 became available | nil | nil | nil | 141*, 142, 143, __144__, 145 |
| 9:06 | Agent 146 became available | nil | nil | nil | 141*, 142, 143, __144__, 145, 146 |
| 9:07 | Agent 147 became available | nil | nil | nil | 141*, 142, 143, __144__, 145, 146, 147 |
| 9:08 | Agent 148 became available | nil | nil | nil | 141*, 142, 143, __144__, 145, 146, 147, __148__ |
| 9:09 | Agent 149 became available | nil | nil | nil | 141*, 142, 143, __144__, 145, 146, 147, __148__, 149 |
| 9:10 | Agent 150 became available | nil | nil | nil | 141*, 142, 143, __144__, 145, 146, 147, __148__, 149, 150 |
| 9:12 | Contact A arrived | 2 | PBR | Agent 144 was assigned to Contact A | 141*, 142, 143, 145, 146, 147, __148__, 149, 150 |
| 9:20 | Contact B arrived | 1 | FIFO | Agent 141 was assigned to Contact B | 142*, 143, 145, 146, 147, __148__, 149, 150 |
| 9:45 | Contact C arrived | 1 | FIFO | Agent 142 was assigned to Contact C | 143*, 145, 146, 147, __148__, 149, 150 |
| 10:06 | Contact D arrived | 2 | PBR | Agent 148 was assigned to Contact D | 143*, 145, 146, 147, __149__, 150 |
| 10:10 | Contact E arrived | 2 | PBR | Agent 146 was assigned to Contact E | 143*, 145, 147, __149__, 150 |
| 10:29 | Contact F arrived | 2 | PBR | Agent 149 was assigned to Contact F | 143*, 145, 147, 150 |
| 10:35 | Contact G arrived | 1 | FIFO | Agent 143 was assigned to Contact G | 145*, 147, __150__ |
| 10:40 | Contact H arrived | 2 | PBR | Agent 150 was assigned to Contact H | 145*, 147 |
| 10:43 | Contact I arrived | 2 | PBR | Agent 145 was assigned to Contact I | __147__* |
| 10:58 | Contact J arrived | 1 | FIFO | Agent 147 was assigned to Contact J | nil |

| Agent | 141 | 142 | 143 | 144 | 145 | 146 | 147 | 148 | 149 | 150 |
|---|---|---|---|---|---|---|---|---|---|---|
| Score | 70 | 50 | 20 | 100 | 30 | 80 | 10 | 90 | 60 | 40 |

| Assignment Algorithm | Total Score | Number of Assignment | Average Score |
|---|---|---|---|
| PBR | 400 | 6 | 66.7 |
| FIFO | 150 | 4 | 37.5 |

Legend
* Longest Waiting
__ Highest Performing
*__ Highest Performing and Longest waiting

Fig. 6

Lengths Of Sequence Of Contacts based Benchmark Simulation

| Time | Events | Assignment Algorithm | Assignment | Agent Queue |
|---|---|---|---|---|
| 9:00 | nil | nil | nil | nil |
| 9:01 | Agent 141 became available | nil | nil | 141* |
| 9:02 | Agent 142 became available | nil | nil | 141*, 142 |
| 9:03 | Agent 143 became available | nil | nil | 141*, 142, 143 |
| 9:04 | Agent 144 became available | nil | nil | 141*, 142, 143, 144 |
| 9:05 | Agent 145 became available | nil | nil | 141*, 142, 143, 144, 145 |
| 9:06 | Agent 146 became available | nil | nil | 141*, 142, 143, 144, 145, 146 |
| 9:07 | Agent 147 became available | nil | nil | 141*, 142, 143, 144, 145, 146, 147 |
| 9:08 | Agent 148 became available | nil | nil | 141*, 142, 143, 144, 145, 146, 147, 148 |
| 9:09 | Agent 149 became available | nil | nil | 141*, 142, 143, 144, 145, 146, 147, 148, 149 |
| 9:10 | Agent 150 became available | nil | nil | 141*, 142, 143, 144, 145, 146, 147, 148, 149, 150 |
| 9:11 | Contact A arrived | FIFO | Agent 141 was assigned to Contact A | 142*, 143, 144, 145, 146, 147, 148, 149, 150 |
| 9:12 | Contact B arrived | FIFO | Agent 142 was assigned to Contact B | 143*, 144, 145, 146, 147, 148, 149, 150 |
| 9:13 | Contact C arrived | PBR | Agent 144 was assigned to Contact C | 143*, 145, 146, 147, 149, 150 |
| 9:14 | Contact D arrived | PBR | Agent 148 was assigned to Contact D | 143*, 145, 146, 147, 149, 150 |
| 9:15 | Contact E arrived | PBR | Agent 146 was assigned to Contact E | 143*, 145, 147, 149, 150 |
| 9:16 | Contact F arrived | FIFO | Agent 143 was assigned to Contact F | 145*, 147, 149, 150 |
| 9:17 | Contact G arrived | FIFO | Agent 145 was assigned to Contact G | 147*, 149, 150 |
| 9:18 | Contact H arrived | PBR | Agent 149 was assigned to Contact H | 147*, 150 |
| 9:19 | Contact I arrived | PBR | Agent 150 was assigned to Contact I | 147* |
| 9:20 | Contact J arrived | PBR | Agent 147 was assigned to Contact J | nil |

| Agent | 141 | 142 | 143 | 144 | 145 | 146 | 147 | 148 | 149 | 150 |
|---|---|---|---|---|---|---|---|---|---|---|
| Score | 70 | 50 | 20 | 100 | 30 | 80 | 10 | 90 | 60 | 40 |

Legend
\* Longest Waiting
Highest Performing
\* Highest Performing and Longest waiting

Fig. 7

| Contact # | 1 | 2 | 3 | 4 | 5 |
|---|---|---|---|---|---|
| Assignment Algorithm | FIFO | FIFO | FIFO | FIFO | FIFO |
| Contact # | 6 | 7 | 8 | 9 | 10 |
| Assignment Algorithm | BP | BP | BP | BP | BP |
| Contact # | 11 | 12 | 13 | 14 | 15 |
| Assignment Algorithm | BP | BP | BP | BP | BP |
| Contact # | 16 | 17 | 18 | 19 | 20 |
| Assignment Algorithm | BP | BP | BP | BP | BP |
| Contact # | 21 | 22 | 23 | 24 | 25 |
| Assignment Algorithm | BP | BP | BP | BP | BP |
| Contact # | 26 | 27 | 28 | 29 | 30 |
| Assignment Algorithm | FIFO | FIFO | FIFO | FIFO | FIFO |
| Contact # | 31 | 32 | 33 | 34 | 35 |
| Assignment Algorithm | BP | BP | BP | BP | BP |
| Contact # | 36 | 37 | 38 | 39 | 40 |
| Assignment Algorithm | BP | BP | BP | BP | BP |
| Contact # | 41 | 42 | 43 | 44 | 45 |
| Assignment Algorithm | BP | BP | BP | BP | BP |
| Contact # | 46 | 47 | 48 | 49 | 50 |
| Assignment Algorithm | BP | BP | BP | BP | BP |
| Contact # | 51 | 52 | 53 | 54 | 55 |
| Assignment Algorithm | FIFO | FIFO | FIFO | FIFO | FIFO |
| Contact # | 56 | 57 | 58 | 59 | 60 |
| Assignment Algorithm | BP | BP | BP | BP | BP |
| Contact # | 61 | 62 | 63 | 64 | 65 |
| Assignment Algorithm | BP | BP | BP | BP | BP |
| Contact # | 66 | 67 | 68 | 69 | 70 |
| Assignment Algorithm | BP | BP | BP | BP | BP |
| Contact # | 71 | 72 | 73 | 74 | 75 |
| Assignment Algorithm | BP | BP | BP | BP | BP |

METHOD, SYSTEM, AND ARTICLE OF MANUFACTURE FOR BENCHMARKING PAIRING STRATEGIES IN CONTACT CENTER SYSTEM

TECHNICAL FIELD

This disclosure generally relates to contact centers and, more particularly, to techniques for benchmarking pairing strategies in a contact center system.

BACKGROUND

A contact center is a system for receiving or transmitting a large number of contacts such as voice telephone calls, Internet text chats, e-mails, and video calls. Contact centers may include outbound contact centers which create a large volume of outgoing contacts from a contact center. Such outbound contact centers are often used to sell products, collect outstanding credit balances, or to survey consumer sentiment, among other applications. Contact centers may also include inbound contact centers, which receive a large volume of incoming contacts from customers. Such inbound contact centers also are used to sell products, and additionally may be used for customer service or technical support enquiries, the retention of customers, or other applications.

Contact centers may also include an interactive voice response ("IVR") unit that provides automated responses to customer inquiries. The IVR unit may respond to the pressing of telephone keypad digits by a customer or use voice recognition tools to respond to verbal inputs by customers. Often, more straightforward customer inquiries can be resolved with the use of an IVR unit while more complex customer interactions may require connection of a customer to a human agent. To the extent that an IVR unit automates what would otherwise be interactions that require a human agent, an IVR unit may reduce the labor costs associated with operating a contact center.

To assign large volumes of contacts to large numbers of agents, contact centers may employ algorithms that seek to balance the degree of effort across individual contact center agents. For example, if many agents are available to receive a contact in a contact center, the contact center may utilize a simple algorithm that assigns an incoming contact to whichever agent has been waiting the longest. Similarly, if all agents are occupied and many contacts have been waiting for assignment, a contact center may use a simple algorithm that assigns the longest waiting contact to whichever agent first becomes available. Such algorithms may be referred to as first-in-first-out ("FIFO") algorithms.

Contact centers may attempt to improve their performance by adopting algorithms other than FIFO. For example, if there are many agents available to receive a contact in a contact center, upon arrival of a contact the contact center may preferentially assign an agent that has had a history of better performance than peer available agents. Similarly, if all agents are occupied and many contacts have been waiting for assignment, a contact center may use an algorithm that assigns the contact it determines to be of the highest value to whichever agent first becomes available. Such algorithms may be referred to as performance-based-routing ("PBR") algorithms.

However, while PBR strategies may improve contact center performance, they present several drawbacks. For example, if there are many contacts in a queue pending assignment to an agent, selecting the highest value contact may increase the amount of time spent pending assignment to an agent for the balance of contacts in queue. Such an increase may result in a reduced overall customer experience, and a reduction in the overall performance of a contact center.

Accordingly, there is a need for algorithms that improve upon PBR strategies such that they continue to balance the work effort of agents, minimize the disparity in waiting times for contacts, and still improve performance over baseline FIFO algorithms. Such algorithms may rely on predicting the likely behavior of customers contacting a contact center, predicting the likely behavior of agents working within a contact center, and assigning customer contacts to agents based on these behavioral predictions. Such algorithms may be referred to as behavioral-pairing ("BP") algorithms.

To determine which of many potential algorithms are most favorable to a contact center, contact centers may establish test and control groups that attempt to determine the relative performance of two or more algorithms. For example, a contact center may divide its agents into two pools, one of which receives contacts using a FIFO strategy while the other receives contacts using a PBR strategy. After some period, the performance of both agent groups can be measured and compared to estimate a difference in performance between the FIFO and the PBR strategy.

However, testing the relative performance of multiple algorithms by dividing agents into corresponding multiple pools may create measurement error. For example, the multiple pools of agents may have variations in agent performance ability such that one algorithm may appear to be better than another not because there is a genuine difference in the performance of the two algorithms but rather because one pool of agents may have more talented agents than the other pool. Contact centers may find it difficult to control for such errors.

Another method of testing the relative performance of multiple algorithms is to refrain from dividing agents into pools and instead dividing contacts into groups. For example, U.S. Pat. No. 10,298,763 teaches that algorithms may be alternated in time such that for contacts arriving in a first period a first algorithm is used, while for contacts arriving in a subsequent second period a second algorithm is used. This alternation is then repeated such that in a third period the first algorithm is used again, and in a fourth period the second algorithm is used again, and so on. Periodically all the contacts assigned by the first algorithm may be grouped and compared to all the contacts assigned by the second algorithm which are similarly grouped. Such a time-based alternation strategy may help eliminate errors in calculating performance differences between contact assignment algorithms.

However, time-based alternation of algorithms may introduce another source of error into measuring the relative performance of contact assignment algorithms. For example, there may be patterns in the behavior of contacts that correlate with the time at which a contact is received in a contact center. Contacts received in the morning may, for example, have a different average propensity to purchase a product compared to contacts received in the evening. Similarly, contacts received at the top half of an hour may have a different average propensity to purchase compared to contacts received at the bottom half of an hour. As a result, grouping contacts based on their time of arrival in a contact center may generate errors in measuring relative performance of contact assignment algorithms.

To reduce such potential biases, U.S. Pat. No. 11,070,674 teaches another method for measuring relative performance of contact assignment algorithms which involves the random or pseudo-random assignment of contacts to different algorithmic treatments. In such a strategy, upon arrival of any contact, that contact may be randomly assigned to an algorithm. Such random assignment of any one contact is not predictive of the assignment of a subsequent contact. Such a strategy may help reduce or eliminate time-based artifacts that can bias the measurement of relative performance of contact assignment algorithms by alternating them in time.

However, while reducing bias with pre-determined time windows, random assignment algorithms may create other sources of bias. For example, if a first contact assignment algorithm reflects a PBR strategy while a second algorithm reflects a FIFO strategy, then the random alternation of the two strategies may have the effect of dividing the agent population into a high-performing group that gets assigned to the PBR strategy and a low-performing group that gets assigned to the FIFO strategy. This may arise because the PBR strategy may immediately acquire higher-performing agents, allowing lower-performing agents to wait longer for a contact. These lower-performing agents are then acquired by the FIFO strategy which may target longer-waiting agents. Such a division of agents by ability may result in inaccurate performance comparisons between contact assignment algorithms.

Accordingly, there may be a need for more fair and accurate techniques for benchmarking pairing strategies in contact centers than those based on the division of agents, on alternation in fixed periods of time, or on random assignment.

SUMMARY

An embodiment of the present disclosure provides a method for benchmarking at least two pairing strategies in a contact center system including: assigning sequence numbers to a series of events; initiating a first pairing strategy based on the sequence numbers; ending the first pairing strategy based on the sequence numbers; initiating a second pairing strategy based on the sequence numbers; ending the second pairing strategy based on the sequence numbers; assigning a first set of values to contacts assigned by the first pairing strategy; assigning a second set of values to contacts assigned by the second pairing strategy; and determining a metric that compares the first pairing strategy with the second pairing strategy based on the first and second set of values, in which at least one of the contacts paired with the first pairing strategy and at least one of the contacts paired with the second pairing strategy are paired with the same agent.

Optionally, in the above method, the series of events is an arrival of contacts in a contact center system.

Optionally, in the above method, the ending the first pairing strategy is based on a target number of contacts.

Optionally, in the above method, the ending the second pairing strategy is based on a target ratio of number of contacts paired with the first pairing strategy to number of contacts paired with the second pairing strategy.

Optionally, the above method further includes cycling between the first pairing strategy and the second pairing strategy.

Optionally, in the above method, the initiating the first pairing strategy, the ending the first pairing strategy, the initiating the second pairing strategy, and the ending the second pairing strategy are based on a target reduction in possible bias in the comparing.

An embodiment of the present disclosure also provides a system for benchmarking at least two pairing strategies in a contact center system, including: at least one computer processor connected to a benchmarking module, in which the at least one computer processor is configured to: assign sequence numbers to a series of events; initiate a first pairing strategy based on the sequence numbers; end the first pairing strategy based on the sequence numbers; initiate a second pairing strategy based on the sequence numbers; end the second pairing strategy based on the sequence numbers; assign a first set of values to contacts assigned by the first pairing strategy; assign a second set of values to contacts assigned by the second pairing strategy; and determine a metric that compares the first pairing strategy with the second pairing strategy based on the first and second set of values, in which at least one of the contacts paired with the first pairing strategy and at least one of the contacts paired with the second pairing strategy are paired with the same agent.

Optionally, in the above system, the series of events is an arrival of contacts in a contact center system.

Optionally, in the above system, the at least one computer processor is further configured to: end the first pairing strategy is based on a target number of contacts.

Optionally, in the above system, the at least one computer processor is further configured to: end the second pairing strategy based on a target ratio of number of contacts paired with the first pairing strategy to number of contacts paired with the second pairing strategy.

Optionally, in the above system, the at least one computer processor is further configured to: cycle between the first pairing strategy and the second pairing strategy.

Optionally, in the above system, the at least one computer processor is further configured to: initiate the first pairing strategy, end the first pairing strategy, initiate the second pairing strategy, and end the second pairing strategy based on a target reduction in possible bias in the comparing.

An embodiment of the present disclosure further provides an article of manufacture for benchmarking at least two pairing strategies in a contact center system, including: a non-transitory processor readable medium; and instructions stored on the medium, in which the instructions are configured to be readable from the medium by at least one processor connected to a benchmarking module and thereby cause the at least one processor to operate so as to: assign sequence numbers to a series of events; initiate a first pairing strategy based on the sequence numbers; end the first pairing strategy based on the sequence numbers; initiate a second pairing strategy based on the sequence numbers; end the second pairing strategy based on the sequence numbers; assign a first set of values to contacts assigned by the first pairing strategy; assign a second set of values to contacts assigned by the second pairing strategy; and determine a metric that compares the first pairing strategy with the second pairing strategy based on the first and second set of values, in which at least one of the contacts paired with the first pairing strategy and at least one of the contacts paired with the second pairing strategy are paired with the same agent.

Optionally, in the above article of manufacture, the series of events is an arrival of contacts in a contact center system.

Optionally, in the above article of manufacture, the at least one computer processor is further caused to operate so as to: end the first pairing strategy is based on a target number of contacts.

Optionally, in the above article of manufacture, the at least one computer processor is further caused to operate so as to:

end the second pairing strategy based on a target ratio of number of contacts paired with the first pairing strategy to number of contacts paired with the second pairing strategy.

Optionally, in the above article of manufacture, the at least one computer processor is further caused to operate so as to: cycle between the first pairing strategy and the second pairing strategy.

Optionally, in the above article of manufacture, the at least one computer processor is further caused to operate so as to: initiate the first pairing strategy, end the first pairing strategy, initiate the second pairing strategy, and end the second pairing strategy based on a target reduction in possible bias in the comparing.

BRIEF DESCRIPTION OF THE DRAWINGS

FIG. 3 is a schematic view showing a process of PBR assignment of contacts to agents according to an embodiment of the present disclosure.

FIG. 4 is a schematic view showing a method for transitioning from one assignment algorithm to another assignment algorithm in a time-based benchmark according to an embodiment of the present disclosure.

FIG. 6 is a schematic view showing a method for transitioning from one assignment algorithm to another assignment algorithm in a random benchmark according to an embodiment of the present disclosure.

FIG. 7 is a schematic view showing a method for transitioning from one assignment algorithm to another assignment algorithm in a method for benchmarking at least two pairing strategies in a contact center system according to another embodiment of the present disclosure.

DETAILED DESCRIPTION

To illustrate the technical solutions of the present disclosure in a clearer manner, the drawings desired for the embodiments of the present disclosure will be described briefly hereinafter. Obviously, the following drawings merely relate to some embodiments of the present disclosure. Based on these drawings, a person skilled in the art may obtain other embodiments without any creative effort.

As used herein, the term "module" can be understood as referring to computing software, firmware, hardware and/or various combinations thereof, which can be configured as network elements, computers and/or components of systems. Modules should not be interpreted as software not implemented on hardware or firmware, or recorded on processor-readable storage media. These modules can be combined, integrated, separated and/or replicated to support various applications. The modules can be implemented on multiple devices and/or other components, which can be local or remote. In addition, these modules can be removed from one device and added to another device, and/or can be included in two devices.

Figure 1:
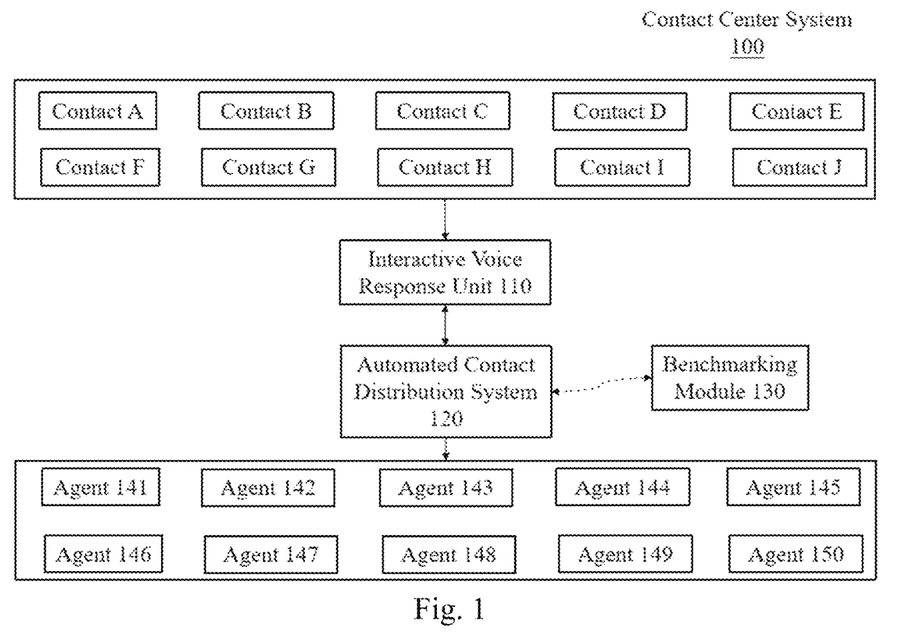
FIG. 1 is a schematic view showing a contact center system according to an embodiment of the present disclosure.

FIG. 1 is a schematic view showing a contact center system 100 which may include an interactive voice response ("IVR") unit 110, an automated contact distribution ("ACD") system 120, a benchmarking module 130, a series of ten contacts A through J that have arrived in the contact center system 100, and a group of ten agents 141 through 150 that have become available in the contact center system 100.

Figure 2:
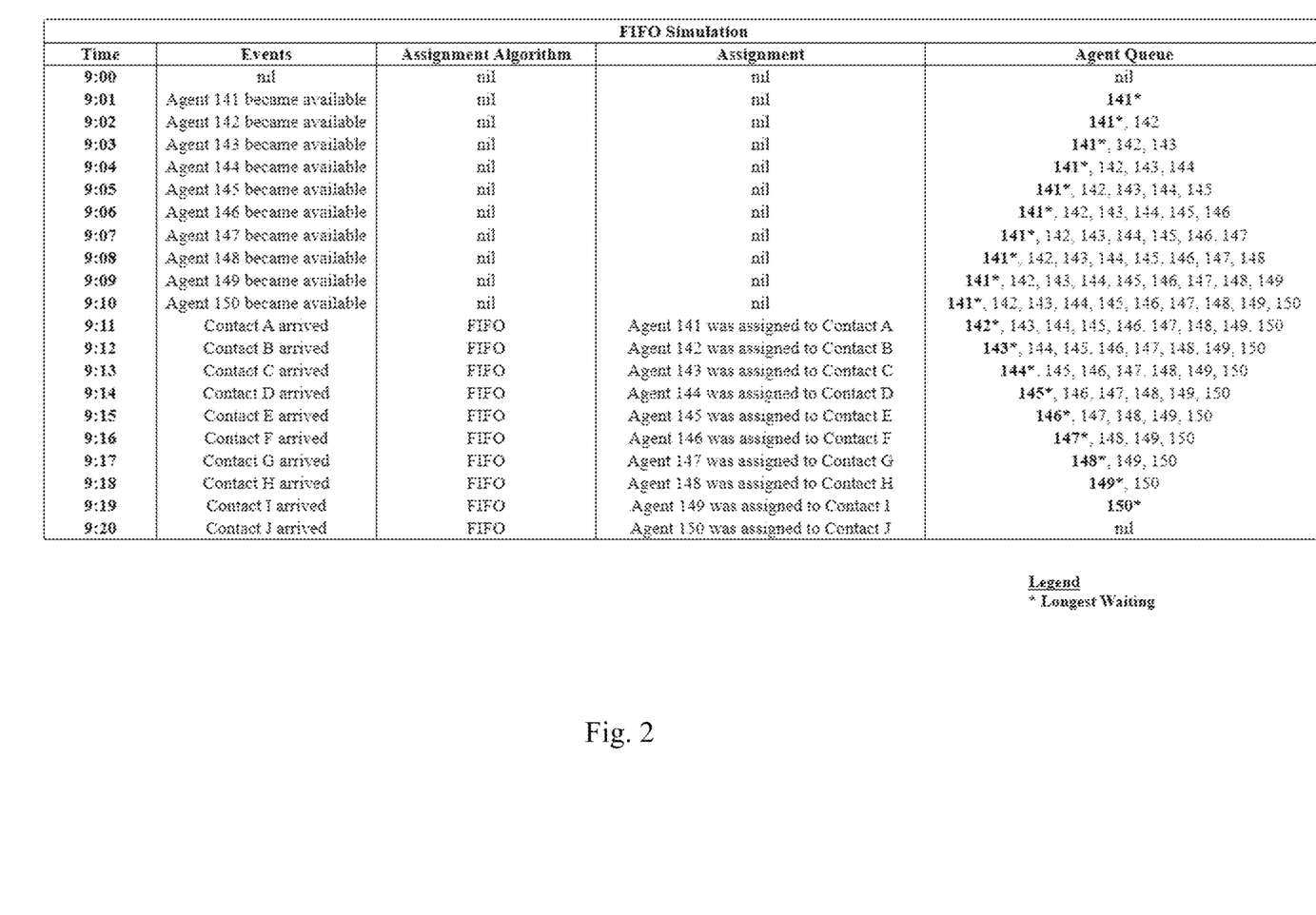
FIG. 2 is a schematic view showing a process of FIFO assignment of contacts to agents according to an embodiment of the present disclosure.

FIG. 2 is a schematic view showing a process of FIFO assignment of contacts to agents according to an embodiment of the present disclosure. For illustration purposes, FIG. 2 shows a common pool of agents with corresponding times at which they became available to receive contacts, i.e., Agent 141 became available at 9:01, Agent 142 became available at 9:02, Agent 143 became available at 9:03, Agent 144 became available at 9:04, Agent 145 became available at 9:05, Agent 146 became available at 9:06, Agent 147 became available at 9:07, Agent 148 became available at 9:08, Agent 149 became available at 9:09, and Agent 150 became available at 9:10. FIG. 2 also shows a set of contacts with corresponding time of arrival to the contact center system 100, i.e., Contact A arrived at 9:11, Contact B arrived at 9:12, Contact C arrived at 9:13, Contact D arrived at 9:14, Contact E arrived at 9:15, Contact F arrived at 9:16, Contact G arrived at 9:17, Contact H arrived at 9:18, Contact I arrived at 9:19, and Contact J arrived at 9:20.

The contacts A through J arrive sequentially in time at the contact center system 100, and are handled by the IVR unit 110 which provides automated responses to customer inquiries while the more complex customer interactions that require connection of a customer to a human agent are routed to the ACD system 120. The ACD system 120 is in charge of routing contacts A through J to the most appropriate agent based on available pairing strategies. In the default scenario, i.e., without any pairing strategy, the ACD system 120 may not communicate with the benchmarking module 130 and route contacts 141 to 150 based on FIFO, i.e., the longest waiting agent in the agent queue takes the first contact arrived.

For the contacts group and agent pool illustrated in FIG. 2, Contact A arrived first in time, at 9:11, and Agent 141 had been available since 9:01 and therefore was the longest waiting (10 min) agent in the agent queue. ACD system 120 routed Contact A to agent 141. Next, contact B arrived at 9:12 and was routed to Agent 142 who was the longest waiting agent in the agent queue at that moment because the previous longest waiting agent, Agent 141, was occupied. The strategy was repeated for Contacts C through J, and for Agents 143 through 150.

FIG. 3 is a schematic view showing a process of PBR assignment of contacts to agents according to an embodiment of the present disclosure, in which FIG. 3 shares the same events as those in FIG. 2, except that the assignment algorithm is PBR. Contact center systems 100 may choose to assign contacts to agents based on a PBR algorithm to improve performance relative to FIFO.

In this case, the contact center system 100 will not allocate contacts using a FIFO mechanism but allocate agents based on their performance scores, with the highest-performance score available agent receiving preference in assignment.

As shown in FIG. 3, Agents 141 through 150 have performance scores of 70, 50, 20, 100, 30, 80, 10, 90, 60 and 40, respectively, which are based on their historical performances. Contact A arrived first in time, at 9:11, and Agent 144 had the highest-performance score of 100, and therefore ACD system 120 routed Contact A to Agent 144. Next, Contact B arrived at 9:12 and was routed to Agent 148 who was the highest-performance score (90) available agent in the agent queue at that moment because the previous highest-performance score agent, Agent 144, was occupied. The strategy was repeated for Contacts C through J, and for the agents left. As a result, Agent 146 was assigned to Contact C, Agent 141 was assigned to Contact D, Agent 149 was assigned to Contact E, Agent 142 was assigned to Contact F, Agent 150 was assigned to Contact G, Agent 145 was assigned to Contact H, Agent 143 was assigned to Contact I, and Agent 147 was assigned to Contact J.

FIG. 4 is a schematic view showing a method for transitioning from one assignment algorithm to another assignment algorithm in a time-based benchmark according to an embodiment of the present disclosure. Time-based benchmarking processes establish alternating time windows for the benchmarking of pairing algorithms. For example, using a time window of 30 minutes, as shown in FIG. 4, all contacts arriving in the first time window (from 9:01 to 9:30), i.e., Contact A, and Contact B, will be routed using a pairing algorithm A (i.e., FIFO); all contacts arriving in second time window (from 9:31 to 10:00), i.e., Contact C, will be routed using a pairing algorithm B (i.e., PBR); all contacts arriving in the third time window (from 10:01 to 10:30), i.e., Contact D, Contact E and Contact F, will be routed using the pairing algorithm A (i.e., FIFO); and all contacts arriving in the fourth time window (from 10:31 to 11:00), i.e., Contact G, Contact H, Contact I and Contact J, will be routed using the pairing algorithm B (i.e., PBR); and so on.

As shown in FIG. 4, Contact A arrived at 9:12 and Contact B arrived at 9:20, thus Contact A and Contact B fell into the first time window and shall be routed using FIFO. Contact C arrived at 9:45, thus Contact C fell into the second time window and shall be routed using PBR. Contact D arrived at 10:06, Contact E arrived at 10:10 and Contact F arrived at 10:29, thus Contact D, Contact E and Contact F fell into the third time window and shall be routed using FIFO. Contacts G through J fell into the fourth time window and shall be routed using PBR.

This time-based alternation of algorithms may introduce another source of error into measuring the relative performance of contact assignment algorithms. For example, if a higher-performing group of agents tends to become available at a time more correlated with pairing algorithm A and less correlated with pairing algorithm B, then pairing algorithm A may inaccurately appear to be outperforming pairing algorithm B. Similarly, if a higher-performing group of contacts tends to arrive in a contact center system 100 at a time more correlated with pairing algorithm B and less correlated with pairing algorithm A, then pairing algorithm B may inaccurately appear to be outperforming pairing algorithm A.

Figure 5:
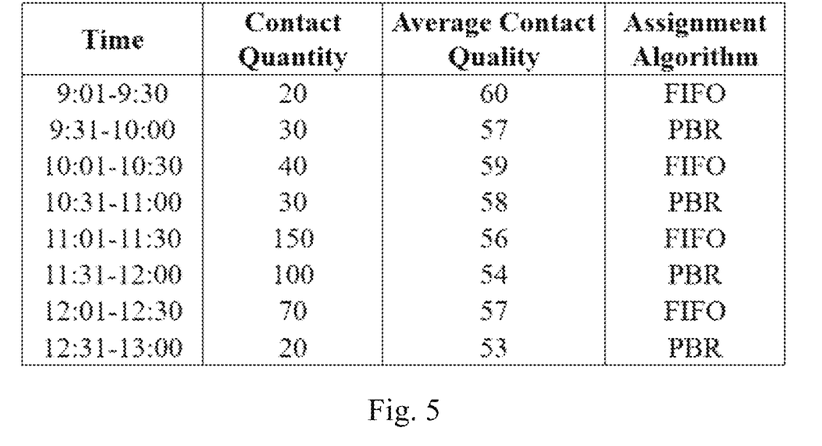
FIG. 5 is a schematic view showing a drawback of a method for transitioning from one assignment algorithm to another assignment algorithm in a time-based benchmark according to an embodiment of the present disclosure.

FIG. 5 is a schematic view showing an average contact quality of a method for transitioning from one assignment algorithm to another assignment algorithm in a time-based benchmark according to an embodiment of the present disclosure. The contacts received at the top half of an hour may have a different average propensity to purchase compared to contacts received at the bottom half of an hour. For example, as shown in FIG. 5, the average contact quality (60) from 9:01 to 9:30 was higher than that (57) from 9:31 to 10:00, the average contact quality (59) from 10:01 to 10:30 was higher than that (58) from 10:31 to 11:00, etc. In this example, the average contact quality of the contacts received at the top half of an hour would always be higher than the average contact quality of the contacts received at the bottom half of an hour. As a result, grouping contacts based on their time of arrival in a contact center system 100 may generate errors in measuring relative performance of contact assignment algorithms.

Time-based benchmarking processes may also suffer from their being evident to contact center agents and hence subject to manipulation. For example, if an agent becomes aware that one pairing algorithm always runs at a particular time of day, then the agent may deliberately suppress the apparent performance of that algorithm by electing to perform poorly during that particular time of day.

FIG. 6 is a schematic view showing a method for transitioning from one assignment algorithm to another assignment algorithm in a random benchmark according to an embodiment of the present disclosure. The random benchmarking processes set the pairing algorithm of contacts based on a random or pseudo-random number generated for each contact.

As shown in FIG. 6, a pseudo-random integer that is either 1 or 2 is generated for each contact, in which the pseudo-random integer of 1 represents PBR algorithm and the pseudo-random integer of 2 represents FIFO algorithm. Contact A is assigned with a pseudo-random integer of 2 and thus routed based on PBR algorithm, Contact B is assigned with a pseudo-random integer of 1 and thus routed based on FIFO algorithm, etc.

However, these benchmarking processes are susceptible to pollution due to transition effects. For example, if a random benchmarking process is comparing a PBR algorithm with a FIFO algorithm, the performance of the PBR algorithm will appear artificially inflated relative to the FIFO algorithm because the PBR algorithm will persistently utilize higher-performing agents while the FIFO algorithm will be left with lower-performing agents.

FIG. 6 also illustrates an example of potential bias in agent selection in a random assignment algorithm. For a series of ten contacts (Contact A to Contact J) arriving sequentially at the contact center system 100, a random assignment algorithm was implemented, resulting in the following order of assignment algorithm, PBR, FIFO, FIFO, PBR, PBR, PBR, FIFO, PBR, PBR and FIFO. For Contact A, agents 141 through 150 were available, each agent with a corresponding agent score based on agent's historical performance, Agent 144 with the highest score of 100 and Agent 147 with the lowest score of 10.

For Contact A, a random assignment algorithm yielded a PBR strategy, which selects the highest performing agent from the queue of available agents. In this case, with all ten agents available, Agent 144 was paired as Agent 144 had the highest score. Next, for Contact B, a random assignment algorithm yielded a FIFO strategy, which looks at the longest waiting agent in queue, in this case, Agent 141. Same was repeated for Contact C, which resulted in the pairing of Agent 142, the next longest waiting agent in queue. For Contact D, however, a random assignment algorithm yielded a PBR strategy, which selected the highest performing agent from the queue of remaining available agents, in this case, Agent 148, with a score of 90.

As the random assignment algorithm works its way through the entire ten contacts and ten agents in queue, a pattern emerges such that each time a PBR strategy is used to assign agents, the agent with the best score is selected, whereas each time a FIFO strategy used, the longest waiting agent is selected. Over the course of ten contacts and ten agents, the random assignment algorithm shows a bias by creating two agent groups based on performance. This is further illustrated in FIG. 6 through a comparison of the average agent performance score among six agents assigned by PBR strategy, 66.7, versus the score among four agents assigned by FIFO, 37.5. However, without the transition effects, the average agent performance score should be 55, which is the average score of ten agents, i.e., Agents 141 through 150. The random algorithm is more susceptible to pollution due to transition effects than other algorithms, because the random assignment algorithm always has more transitions. As used herein, the term "transition" can be understood as switch from one assignment algorithm to another assignment algorithm.

In a contact center system 100, preferred benchmarking processes shall minimize the impact of agent- and contact-selection biases between multiple pairing algorithms. Such preferred processes should also be imperceptible to both agents and contacts to avoid conscious or subconscious bias by agents and contacts and to avoid placebo effects. Such processes should also be accurate as to establishing which pairing algorithm was used in assigning each contact, and should provide an easy mechanism for subsequently calculating the difference in performance between pairing algorithms.

Accordingly, there is a need for more fair and accurate techniques for benchmarking pairing strategies in the contact center system 100.

FIG. 7 is a schematic view showing a method for transitioning from one assignment algorithm to another assignment algorithm in a method for benchmarking at least two pairing strategies in a contact center system 100 according to an embodiment of the present disclosure.

As shown in FIG. 7, the method of present disclosure alternates between the at least two pairing strategies based on the lengths of sequences of contacts. For example, the method may alternate between two pairing strategies in a certain pattern. In such a case the first two contacts (A and B) received in a contact center system 100 may be assigned based on a first algorithm (FIFO). Thereafter the next three contacts (C, D and E) received in a contact center system 100 may be assigned based on a second algorithm (BP). Thereafter the next two contacts (F and G) received in a contact center system 100 may be assigned based on the first algorithm (FIFO). Thereafter the next three contacts (H, I and J) may be assigned again based on the second algorithm (BP), and so on. Periodically, a calculation is performed to measure the difference in performance between contacts paired using the first algorithm and contacts paired using second algorithm.

The benchmarking solution of the present disclosure may define the number of contacts for each pairing strategy and cycle through them in a round-robin fashion. This reduces pollution from the bias created by random benchmarking process in preferentially assigning higher performing agents to PBR algorithms. It also reduces and potentially eliminates pollution arising from the correlation of contact center events such as shift changes with times of day in which a particular pairing algorithm is overrepresented by a time-based benchmarking process.

Figure 8:
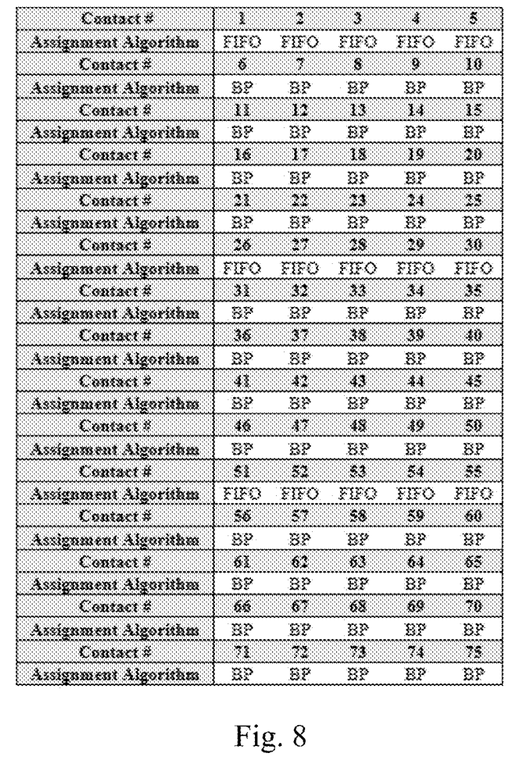
FIG. 8 is a method for transitioning from one assignment algorithm to another assignment algorithm in a method for benchmarking at least two pairing strategies in a contact center system according to another embodiment of the present disclosure.

FIG. 8 is a method for transitioning from one assignment algorithm to another assignment algorithm in a method for benchmarking at least two pairing strategies in a contact center system 100 according to another embodiment of the present disclosure.

As shown in FIG. 8, sequence numbers of #1 to #75 were assigned to arrivals of contacts in a contact center system 100. A target number of FIFO strategy contacts in a sequence was set to be five, and a target ratio of number of contacts paired with FIFO to number of contacts paired with BP strategy was set to be 1:4. Then, FIFO strategy was determined to be initiated at #1 contact and ended at #5 contact. BP strategy was determined to be initiated at #6 contact and ended at #25 contact, in which the number of contacts paired with BP strategy is twenty (five times four). BP and FIFO strategies were then cycled in a round-robin fashion. FIFO strategy would be determined to be further initiated at #26 contact and ended at #30 contact, and FIFO strategy would be determined to be further initiated at #31 contact and ended at #50 contact. Then, a first set of performances may be assigned to contacts assigned by FIFO strategy, and a second set of performances may be assigned to contacts assigned by BP strategy. The performance of the aggregated contacts assigned with FIFO strategy was compared with the performance of the aggregated contacts assigned with BP strategy, and the difference in performance could be used as a metric for comparing these two strategies. In this example, both strategies may use a common pool of agents, and at least one of the contacts paired with FIFO strategy and at least one of the contacts paired with BP strategy may be paired with the same agent.

Figure 9:
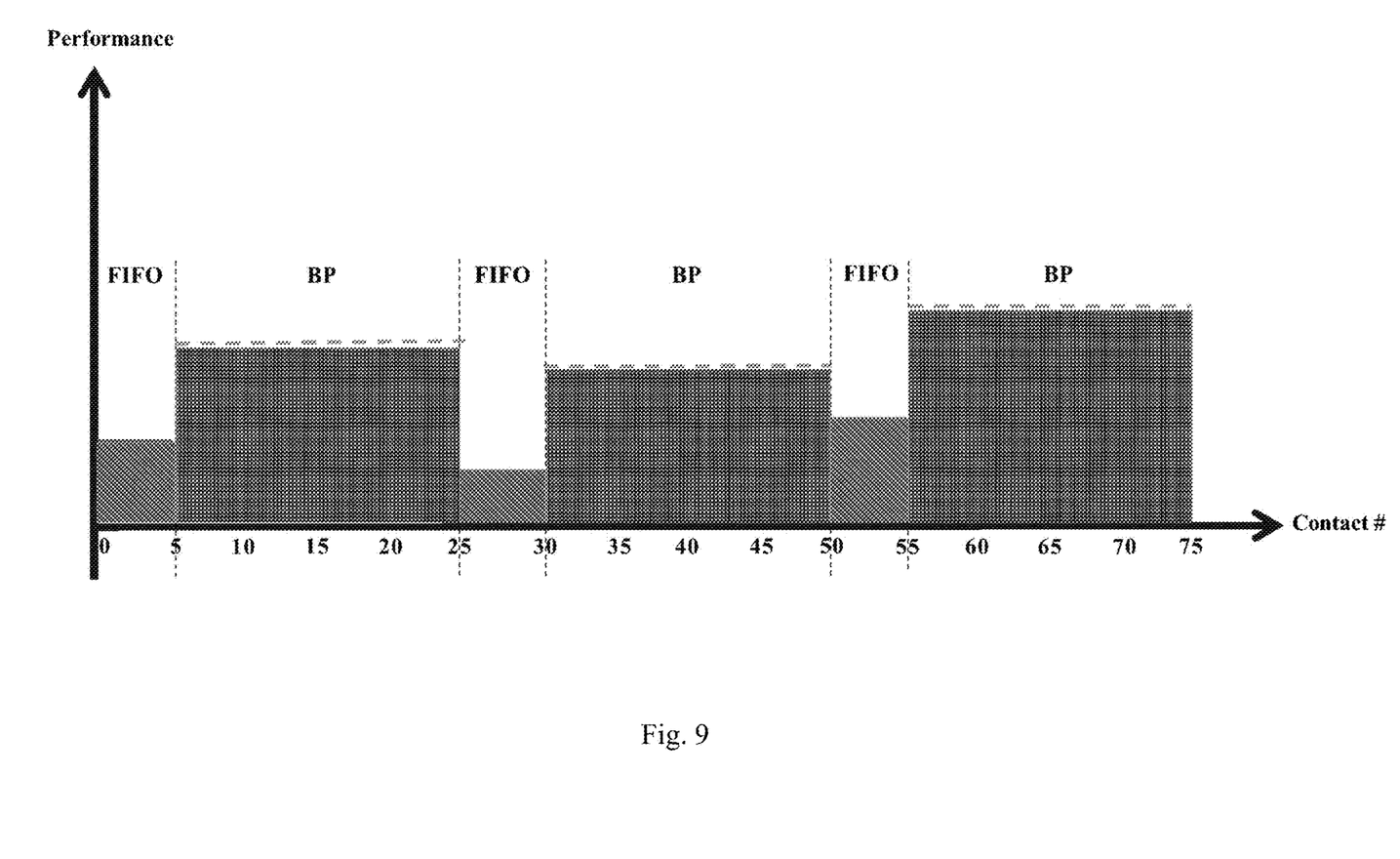
FIG. 9 is a schematic view showing a performance comparison between two pairing strategies in a method for benchmarking at least two pairing strategies based on contact sequence numbers according to an embodiment of the present disclosure.

FIG. 9 is a schematic view showing a performance comparison between two pairing strategies in a method for benchmarking at least two pairing strategies based on contact sequence numbers according to FIG. 8.

As shown in FIG. 9, the average performance of the aggregated contacts assigned with FIFO strategy at #1 contact through #5 contact is calculated and plotted, the average performance of the aggregated contacts assigned with BP strategy at #6 contact through #25 contact is calculated and plotted, the average performance of the aggregated contacts assigned with FIFO strategy at #26 contact through #30 contact is calculated and plotted, etc. As FIG. 9 shows, the average performance of the aggregated contacts assigned with BP strategy is higher than the average performance of the aggregated contacts assigned with FIFO strategy. Although there may be fluctuations in the average performance between several contact sequences assigned by the same strategy, but overall the average performance of BP strategy is expected to be higher than that of FIFO strategy. For example, the average performance of the aggregated contacts assigned with FIFO strategy at #1 contact through #5 is lower than that at #25 contact through #30, and higher than that at #51 contact through #55. There may also be a similar situation in the average performance of the aggregated contacts assigned with BP strategy.

The techniques of the present disclosure are more resilient against malicious actors that might intentionally cause benchmark skew as it may be more difficult for an agent to establish what strategy a particular contact is being handled with as the selection of strategy is not correlated to any time period.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for benchmarking at least two pairing strategies in a contact center system, comprising:
    assigning sequence numbers to a series of events;
    initiating a first pairing strategy based on the sequence numbers;
    ending the first pairing strategy based on the sequence numbers;
    initiating a second pairing strategy based on the sequence numbers;
    ending the second pairing strategy based on the sequence numbers;
    assigning a first set of values to contacts assigned by the first pairing strategy;
    assigning a second set of values to contacts assigned by the second pairing strategy; and
    determining a metric that compares the first pairing strategy with the second pairing strategy based on the first and second set of values,
    wherein a first contact paired using the first pairing strategy and a second contact paired with the second pairing strategy are paired to the same agent.

2. The method of claim 1, wherein the series of events is an arrival of contacts in a contact center system.

3. The method of claim 1, wherein the ending the first pairing strategy is based on a target number of contacts.

4. The method of claim 1, wherein the ending the second pairing strategy is based on a target ratio of number of contacts paired with the first pairing strategy to number of contacts paired with the second pairing strategy.

5. The method of claim 1, further comprising cycling between the first pairing strategy and the second pairing strategy.

6. The method of claim 1, wherein the initiating of the first pairing strategy, the ending of the first pairing strategy, the initiating of the second pairing strategy, and the ending of the second pairing strategy are based on a target reduction in possible bias in the comparing.

7. A system for benchmarking at least two pairing strategies in a contact center system, comprising:
    at least one computer processor connected to a benchmarking module, wherein the at least one computer processor is configured to:
    assign sequence numbers to a series of events;
    initiate a first pairing strategy based on the sequence numbers;
    end the first pairing strategy based on the sequence numbers;
    initiate a second pairing strategy based on the sequence numbers;
    end the second pairing strategy based on the sequence numbers;
    assign a first set of values to contacts assigned by the first pairing strategy;
    assign a second set of values to contacts assigned by the second pairing strategy; and
    determine a metric that compares the first pairing strategy with the second pairing strategy based on the first and second set of values,
    wherein a first contact paired using the first pairing strategy and a second contact paired with the second pairing strategy are paired to the same agent.

8. The system of claim 7, wherein the series of events is an arrival of contacts in a contact center system.

9. The system of claim 7, wherein the at least one computer processor is further configured to: end the first pairing strategy is based on a target number of contacts.

10. The system of claim 7, wherein the at least one computer processor is further configured to:
    end the second pairing strategy based on a target ratio of number of contacts paired with the first pairing strategy to number of contacts paired with the second pairing strategy.

11. The system of claim 7, wherein the at least one computer processor is further configured to: cycle between the first pairing strategy and the second pairing strategy.

12. The system of claim 7, wherein the at least one computer processor is further configured to:
    initiate the first pairing strategy, end the first pairing strategy, initiate the second pairing strategy, and end the second pairing strategy based on a target reduction in possible bias in the comparing.

13. An article of manufacture for benchmarking at least two pairing strategies in a contact center system, comprising:
    a non-transitory processor readable medium; and
    instructions stored on the medium,
    wherein the instructions are configured to be readable from the medium by at least one processor connected to a benchmarking module and thereby cause the at least one processor to operate so as to:
    assign sequence numbers to a series of events;
    initiate a first pairing strategy based on the sequence numbers;
    end the first pairing strategy based on the sequence numbers;
    initiate a second pairing strategy based on the sequence numbers;
    end the second pairing strategy based on the sequence numbers;
    assign a first set of values to contacts assigned by the first pairing strategy;
    assign a second set of values to contacts assigned by the second pairing strategy; and
    determine a metric that compares the first pairing strategy with the second pairing strategy based on the first and second set of values,
    wherein a first contact paired using the first pairing strategy and a second contact paired with the second pairing strategy are paired to the same agent.

14. The article of manufacture of claim 13, wherein the series of events is an arrival of contacts in a contact center system.

15. The article of manufacture of claim 13, wherein the at least one computer processor is further caused to operate so as to:
    end the first pairing strategy is based on a target number of contacts.

16. The article of manufacture of claim 13, wherein the at least one computer processor is further caused to operate so as to:

end the second pairing strategy based on a target ratio of number of contacts paired with the first pairing strategy to number of contacts paired with the second pairing strategy.

17. The article of manufacture of claim 13, wherein the at least one computer processor is further caused to operate so as to:
cycle between the first pairing strategy and the second pairing strategy.

18. The article of manufacture of claim 13, wherein the at least one computer processor is further caused to operate so as to:
initiate the first pairing strategy, end the first pairing strategy, initiate the second pairing strategy, and end the second pairing strategy based on a target reduction in possible bias in the comparing.

* * * * *